US011250149B2

(12) United States Patent
Koch et al.

(10) Patent No.: US 11,250,149 B2
(45) Date of Patent: Feb. 15, 2022

(54) ARTICLE MANAGEMENT SYSTEM

(71) Applicant: Neutrality, Inc., Elkhorn, NE (US)

(72) Inventors: Daniel Alexander Koch, Elkhorn, NE (US); Cody M Jones, Houston, TX (US); Philip Sheridan Dawley, Thousand Oaks, CA (US); Michael Joseph Ferro, Westlake Village, CA (US)

(73) Assignee: Neutrality, Inc., Elkhorn, NE (US)

( * ) Notice: Subject to any disclaimer, the term of this patent is extended or adjusted under 35 U.S.C. 154(b) by 200 days.

(21) Appl. No.: 16/386,996

(22) Filed: Apr. 17, 2019

(65) Prior Publication Data
US 2020/0334369 A1 Oct. 22, 2020

(51) Int. Cl.
| G06F 7/04 | (2006.01) |
| G06F 17/30 | (2006.01) |
| G06F 21/62 | (2013.01) |
| G06N 5/02 | (2006.01) |
| G06Q 30/06 | (2012.01) |

(52) U.S. Cl.
CPC ........... *G06F 21/6218* (2013.01); *G06N 5/02* (2013.01); *G06Q 30/0609* (2013.01)

(58) Field of Classification Search
CPC ........... G06F 21/6218; H04L 2463/101; H04L 63/10; H04L 63/105
USPC .......................................................... 726/28
See application file for complete search history.

(56) References Cited

U.S. PATENT DOCUMENTS

| 10,068,074 | B2* | 9/2018 | Mercury | G06F 21/45 |
| 10,133,812 | B2* | 11/2018 | Lee | G06F 16/335 |
| 2003/0023461 | A1* | 1/2003 | Quintanilla | A61B 5/7435 705/3 |
| 2007/0136147 | A1* | 6/2007 | Stremler | G06Q 30/0601 705/26.1 |
| 2007/0198372 | A1* | 8/2007 | Stremler | G06Q 30/04 705/26.1 |
| 2011/0288946 | A1* | 11/2011 | Baiya | G06F 21/602 705/26.1 |
| 2012/0089410 | A1* | 4/2012 | Mikurak | G06Q 30/0225 705/1.1 |
| 2013/0066862 | A1* | 3/2013 | Orr | G06F 16/958 707/728 |
| 2013/0124856 | A1* | 5/2013 | Agrawal | H04L 63/10 713/156 |

(Continued)

*Primary Examiner* — Lizbeth Torres-Diaz
(74) *Attorney, Agent, or Firm* — Amsel IP Law PLLC; Jason Amsel

(57) ABSTRACT

An article management system collects articles from different sources, processes each article to extract information about the article (such as the topics covered in the article), and stores the information in one or more knowledge graphs. The system also maintains user profiles for each of its users. Each user profile includes a user genome representing the user's interests and preferences. The information in the knowledge graphs can be used to select articles to be displayed to users of the article management system. Articles can be displayed as part of the search results for an associated topic or concept, as part of a personalized feed that is generated based on the data in a user's profile, or as part of a feature that displays multiple articles that cover a given topic from multiple different viewpoints. The system can also provide a platform for users to create and publish research collections.

20 Claims, 10 Drawing Sheets

(56) References Cited

U.S. PATENT DOCUMENTS

| | | | | |
|---|---|---|---|---|
| 2015/0039698 A1* | 2/2015 | Mavalankar | ............ | H04L 51/32 |
| | | | | 709/206 |
| 2016/0048681 A1* | 2/2016 | Fang | ....................... | G06F 21/56 |
| | | | | 726/23 |
| 2016/0048698 A1* | 2/2016 | Sahu | ................. | G06F 16/90335 |
| | | | | 707/783 |
| 2016/0103896 A1* | 4/2016 | Briere | ..................... | H04L 67/26 |
| | | | | 707/723 |
| 2020/0334369 A1* | 10/2020 | Koch | ....................... | G06N 5/02 |

* cited by examiner

Article Meta Data

Genre: News
Category: Politics
Publisher: New York Times

Keywords
Illegal Immigration
Immigration and Emigration
Administration for Children and Families People:
Ron Nixon
Border Patrol
John Moore
Steven Wagner
Wagner Organizations:
Administration for Children and Families
The Department of Health and Human Services Office of Refugee Resettlement
The Department of Homeland Security
Senate Location:
Honduras
Marion
WASHINGTON
Texas
McAllen
The United States
Southwest
Guatemala
New York
El Salvador
Ohio
U.S.

Today's Game Credits: 9800    28:04    Your Neutrality Credits: 5345  (PW) Philip Wilson

352

« Today's Stories/Article Page

Neutrality Analysis   Annotate   Comment   Add to collection

The New York Times
Federal Agencies Lost Track of Hundreds of Migrant Children Placed With Sponsors The Administration for Children and Families learned of the missing children only after calling people who took responsibility for the youths when they were released from government custody.

By Ron Nixon
11-28-2018

Open Mind
33 related articles
12 in the last 3 months 16 negative | 8 neutral | 9 positive   view entire list>>

Immigration and Emigration
For Migrants on Both Sides of the Borer, the One Constant is a Long Wait
-By Miriam Jordan, Kirk Semple and Caitlin Dickerson
New York Times
1 hr ago 11/27/2018

Negative — Neutral — Positive

Article Metrics
To get real time iterative article metrics in your project or view ALL articles in a reserch project Gender   Article views    Political Affiliation    Age All Men Women
                                                   Under 18
                                                   18-24
                                                   25-34
                                                   35-44
                                                   45-54
                                                   55-64
                                                   65+

356 — Neutrality Sentiment Analysis    Network Value: 50 credits
Help us improve the Neutrality Knowledge Base by rating the article Neutrality
Your Rating
○ ○ ○ ○
Submit Rating Neutrality Sentiment Analysis
Help us improve the Neutrality Knowledge Base by validating the keywords
Network Value: 100 credits Keywords
Illegal Immigration
Immigration

354

| | Alabama vs. Clemson score: Tigers crush Tide to relaim throne, win 2019 national championship<br>By Chip Patterson & Ben Kercheval<br>CBS Sports<br>22 minutes ago 01/08/2019 | Tagged by:<br>Brad Smith, Mike Jones<br><br>☐ 2 Annotations | ⑤<br>◰<br><br>◯ 2 Comments |

*Alabama-Clemson IV was polarizing in a number of ways. There was no doubt that these were the two best teams in college football, as they had been the top two wire-to-wire from preseason until now. However, with "fatigue" apparently setting in among casual fans, this game didn't quite hathe build-up as previous editions did. That view looked to be silly early on, though, with a 27-point first quarter that had plenty of momentum swings--from pick-sixes to long touchdowns.* ⎯ 424

☐ Bill Smith    3hrs ago  01/08/2019

Exiting game! Its all about the players. Just look at Trayvon Mullen stats - https://thedraftnetwork.com/2019/02/15/2019-nfl-draft-player-profile-trayvon-mullen/ - he will definitely go pro ◯ Rachel Abrams    4hrs ago 01/08/2019    ⎯ 428

I disagree as a diehard Alabama fan this game was great. Tagovailoa was off his game

*Take that for what it's worth, but with plenty of young talent around him, Clemson's trajectory doesn't look like it's plateauing anytime soon. And now that Clemson is recruiting at a top-10 level, young guys will continue to come into the program and push for playing time.* ⎯ 426

☐ Frank Waters    6hrs ago

I agree. The program is attracting top talent so they will continue to dominate for the foreseeable future - https://www.sports-reference.com/cfb/schools/clemson/2018.html    ⎯ 430

FIG. 4C

ARTICLE MANAGEMENT SYSTEM

FIELD OF THE DISCLOSURE

The present disclosure pertains generally to an article management system. More particularly, the present disclosure relates to a semantic processing engine that identifies keywords associated with an article and to a research platform that allows users to create and publish research collections.

BACKGROUND

With the rise in popularity of internet-based services, many people have started to forego conventional news sources like printed newspapers and televised news broadcasts in favor of purely digital news sources. In particular, people have started to rely on digital platforms such social media feeds and news aggregation services to find and read news articles.

SUMMARY

An article management system collects articles from different sources, processes each article to extract information about the article (such as the topics and concepts covered in the article), and stores the information in one or more knowledge graphs. The system also maintains user profiles for each of its users. Each user profile includes a user genome representing the user's interests and preferences. The article management system can use the information in the knowledge graphs and in a user's genome to select articles to be displayed to the user. Articles can be displayed as part of the search results for an associated topic or concept, as part of a personalized feed that is generated based on the data in a user's profile, or as part of a feature that displays multiple articles that cover a given topic from multiple different viewpoints.

The article management system processes each article with a semantic processing engine that identifies keywords representing the topics, concepts, and sentiment associated with the article. In one embodiment, the semantic processing engine operates by generating a set of normalized fields for an article. The normalized fields include key elements of the article, such as the title, author, a summary of the article, and one or more keywords and concepts that were provided as part of the article's content or metadata. The semantic processing engine performs analysis on the set of normalized fields to generate the keywords for the article. The article management system can also assign a weight to one or more of the keywords to represent the degree to which the article is related to the topic, concept, or sentiment expressed by that keyword.

The semantic processing engine can also update and refine the keywords associated with an article based on input received from users of the article management system. After generating an initial set of keywords for an article, the article can be displayed to users of the article management system. When the article is displayed to users, the article management system can provide an interface that allows users to provide feedback on the accuracy of the keywords that have been associated with the topic. The semantic processing engine can use this user feedback to add or remove keywords and/or adjust the weights associated with one or more keywords. When processing an article, the semantic processing engine can also assign a sentiment score representing the viewpoint of the article. The sentiment score can similarly be adjusted based on user feedback.

When a user selects an article, the article management system can display other articles on the same topic that have a different sentiment score. This has the effect of exposing the user to a variety of different viewpoints on the topic at hand and can help diffuse the "echo chamber" effect that often arises when a customized news aggregation service or social media feed only displays articles that match a user's pre-existing viewpoints.

The article management system can also provide a platform for users to create and publish research collections. Research collections are collections of one or more articles selected by one or more authoring users (e.g., a curated set of articles that the users found after performing research on a particular topic). The research collection can also include user generated content, including annotations or comments on the selected articles, a description of the research collection, and attachments, such as a research paper or newsletter drafted by the users. The authoring users can then publish the research collection to make it available to other users of the article management system.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every embodiment of the teachings disclosed herein and do not limit the scope of the claims.

FIG. 3A is a screenshot illustrating a user interface containing an article feed presented by the article management system, according to one embodiment.

FIG. 3B is a screenshot illustrating a user interface containing analysis of one article, according to one embodiment.

FIG. 4C is a screenshot illustrating a user interface for viewing annotations and comments on one article in a research collection, according to one embodiment.

DETAILED DESCRIPTION

Figure 1:
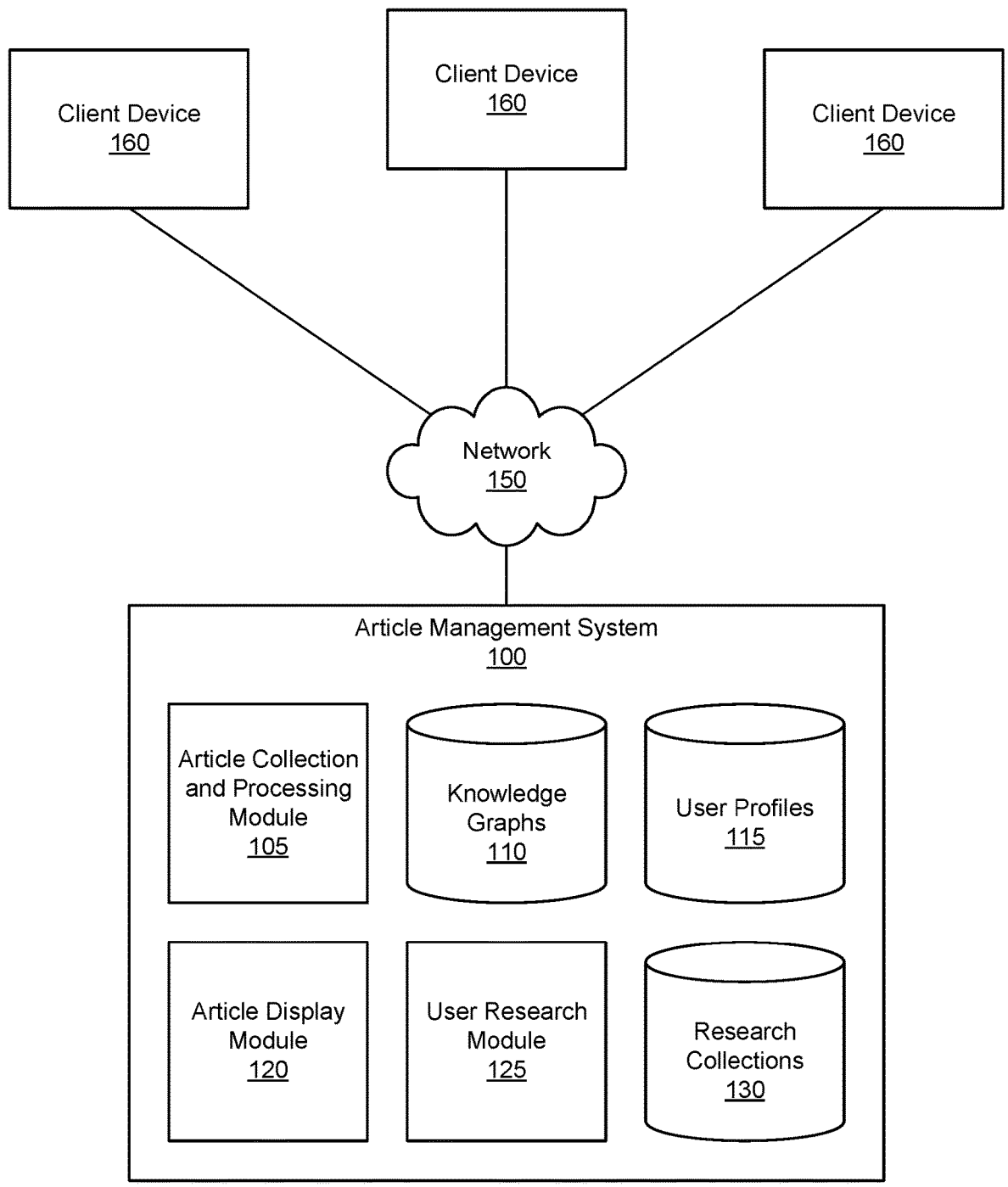
FIG. 1 is a block diagram illustrating a system environment for an article management system, according to one embodiment.

Persons of ordinary skill in the art will understand that the present disclosure is illustrative only and not in any way limiting. Other embodiments of the presently disclosed system and method readily suggest themselves to such skilled persons having the assistance of this disclosure.

Each of the features and teachings disclosed herein can be utilized separately or in conjunction with other features and teachings to provide a system and method for electronic contract management. Representative examples utilizing many of these additional features and teachings, both separately and in combination, are described in further detail with reference to the attached figures. This detailed description is merely intended to teach a person of skill in the art further details for practicing embodiments of the disclosure and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

One embodiment of the present disclosure is an article management system that collects articles from different sources, processes each article to extract information about the article (such as the topics and concepts covered in the article), and stores the information in one or more knowledge graphs. The system also maintains user profiles for each of its users. Each user profile includes a user genome representing the user's interests and preferences. The information in the knowledge graphs can be used to select articles to be displayed to users of the article management system. Articles can be displayed as part of the search results for an associated topic or concept, as part of a personalized feed that is generated based on the data in a user's profile, or as part of an Open Mind feature that displays multiple articles that cover a given topic from multiple different viewpoints.

Referring now to the drawings, wherein like reference numerals denote like or corresponding parts throughout the drawings, and more particularly to FIGS. 1-6, embodiments of various features of the article management system are shown.

FIG. 1 is a block diagram illustrating a system environment for an article management system, according to one embodiment. In the embodiment shown in FIG. 1, the system environment includes the article management system 100, a network 150, and one or more client devices 160.

The article management system 100 shown in FIG. 1 includes an article collection and processing module 105, one or more knowledge graphs 110, user profiles 115, an article feed module 120, a user research module 125, and one or more research collections 130. In other embodiments, the functionality described with respect to the modules shown in FIG. 1 may be distributed among the components of the article management system 100 in a different manner.

The article collection and processing module 105 collects articles from one or more different sources and performs semantic processing on each article to identify keyword and concept ontologies associated with each article. The keyword and concept ontologies for an article represent one or more topics, concepts, and sentiments expressed in the article. The module 105 stores the keyword and concept ontologies for the collected articles in one or more knowledge graphs 110. The functionality of the article collection and processing module 105 is described in further detail below with respect to FIG. 2A.

As referred to herein, an article is any kind of content item that includes human-readable written work, such as one or more paragraphs of text. An article can additionally include other content such as one or more images, captions for those images, and a title. An article can also include metadata, such as the names of one or more authors, the name of the publication in which the article appears, a date on which the article was published. Examples of articles include news articles, weblog ("blog") entries, academic papers, journal articles, court opinions, and government documents.

Each of the user profiles 115 contains a set of information associated with one user of the article management system 100. A user profile can include, for example, a unique identifier for the user, basic biographical and contact information about the user, such as the user's name and email address, a list of topics, reporters, publications, and other items that the user has followed, and a user genome associated with the user. The user genome is a compilation of the user's interests (e.g., topics, concepts, reporters, publications, etc.) and is generated by the article management system 100 based on the user's activity on the system (e.g., the items the user has followed, the keywords that the user has searched for, the articles the user has viewed and/or saved to research collections, etc.).

In some embodiments, the article management system 100 provides a user interface that allows the user to directly view and edit his or her user genome by adding new interests or removing existing interests. The ability of a user to view and edit his or her user genome in this manner is particularly advantageous because it provides the user with a sense of ownership over his or her data and allows the user to further customize the content shown in his or her article feed.

In some embodiments, the article management system 100 also implements a credit system that allows the user to earn and spend credits, and a user's credit balance may also be stored as part of his or her user profile. In some embodiments, the user can earn credits by giving consent for his or her user genome (or a specific portion of his or her user genome) to be used to select promoted content items (such as ads or promoted articles) to be displayed to the user, either as part of the user's article feed or part of another user interface provided by the article management system 100. Allowing the user to affirmatively consent to having his or her user genome used in this manner similarly provides the user with a sense of ownership over his or her data and avoids the perception that the data is being "sold" to third parties. Similarly, a user can spend credits to promote a particular content item (such as an ad or a particular article) and have that content item be displayed to other users of the article management system 100. A user can also provide a tip or gratuity for an article by transferring credits to the publisher or author of the article. This allows the user to express that he or she would like to see more content similar to the article for which he or she provided the tip.

In embodiments where the article management system 100 implements a credit system, the system 100 may also allow users to exchange real-world currency (e.g., fiat currency such as US Dollars or cryptocurrencies such BITCOIN or ETHEREUM) for credits. In some embodiments, the credits system may be implemented by storing transactions on a separate blockchain (i.e., making the credits into a separate blockchain-based cryptocurrency) rather than by storing a credit balance as part of each user profile.

The article display module 120 implements user interfaces that display articles to users in one or more different ways. In one embodiment, the article display module 120 implements a search interface that allows a user to search for articles by inputting one or more keywords, categories, topics, or concepts.

In some embodiments, the article display module 120 additionally or alternatively implements an article feed interface that presents an article feed to each user of the article management system 100. In these embodiments, the article display module 120 implements algorithms that select articles to display in a user's article feed based on the interests in the user's genome. An example of an article feed interface is described in further detail below with respect to FIG. 3A.

After the user selects an article in either the search interface, the article feed interface, or some other user interface that displays articles, the article display module 120 displays an article viewing interface that includes information associated with the article. The information can include metadata associated with the article and can additionally include the keyword and concept ontologies that the article collection and processing module 105 identified for the article. The article viewing interface can additionally include interface elements that allow the user to provide user feedback on the accuracy of the keyword and concept ontologies for the article, and the user feedback can be sent back to the article collection and processing module 105 to update and refine one or more of the knowledge graphs 110. In embodiments where the article management system 100 also implements a credit system, the user can earn credits by providing user feedback. An example of an article viewing interface is described in further detail below with respect to FIG. 3B.

The user research module 125 implements a research marketplace that allows users to request, create, edit, and share research collections 130 on the article management system 100. A research collection 130 is a collection of articles chosen by one or more authoring users (e.g., related to a single topic or a small number of related topics), along with additional information related to the articles that the authoring users have generated. The additional information can include, for example, annotations and comments on one or more of the articles, a text summary of the articles in the research collection, and one or more attachments, such as a paper or one or more images. An example data structure for implementing a research collection 130 is described in further detail below with respect to FIG. 4A, and examples of research collections are described below with respect to FIGS. 4B and 4C.

The user research module 125 provides several different ways for users to request, create, edit, and share research collections 130. For example, a group of authoring users may create a research collection about a topic that interests them, such as immigration policy in the United States. The authoring users can then add one or more articles about immigration to the research collection, and one or more of the authoring users can also write a newsletter that summarizes recent events related to immigration and add the newsletter to the research collection as an attachment. The authoring users can then publish the research collection on the research marketplace, which allows other users of the article management system 100 to view the research collection. In some embodiments, the user research module 125 allows authoring users to charge other users credits to view their research collection. An example process for creating and publishing a research collection in this manner is described in further detail with respect to FIG. 5.

As another example, a requesting user can submit a request for a research collection relating to a topic of his or her choice. The request can include an offer from the requesting user to pay credits to an authoring user who accepts the request and creates the research collection. This allows the requesting user to use the research marketplace to hire a research assistant and provides a way for the research assistant to assemble, summarize, and deliver the results of his or her research. An example process for requesting and creating a research collection in this manner is described in further detail with respect to FIG. 6.

Figure 2A:
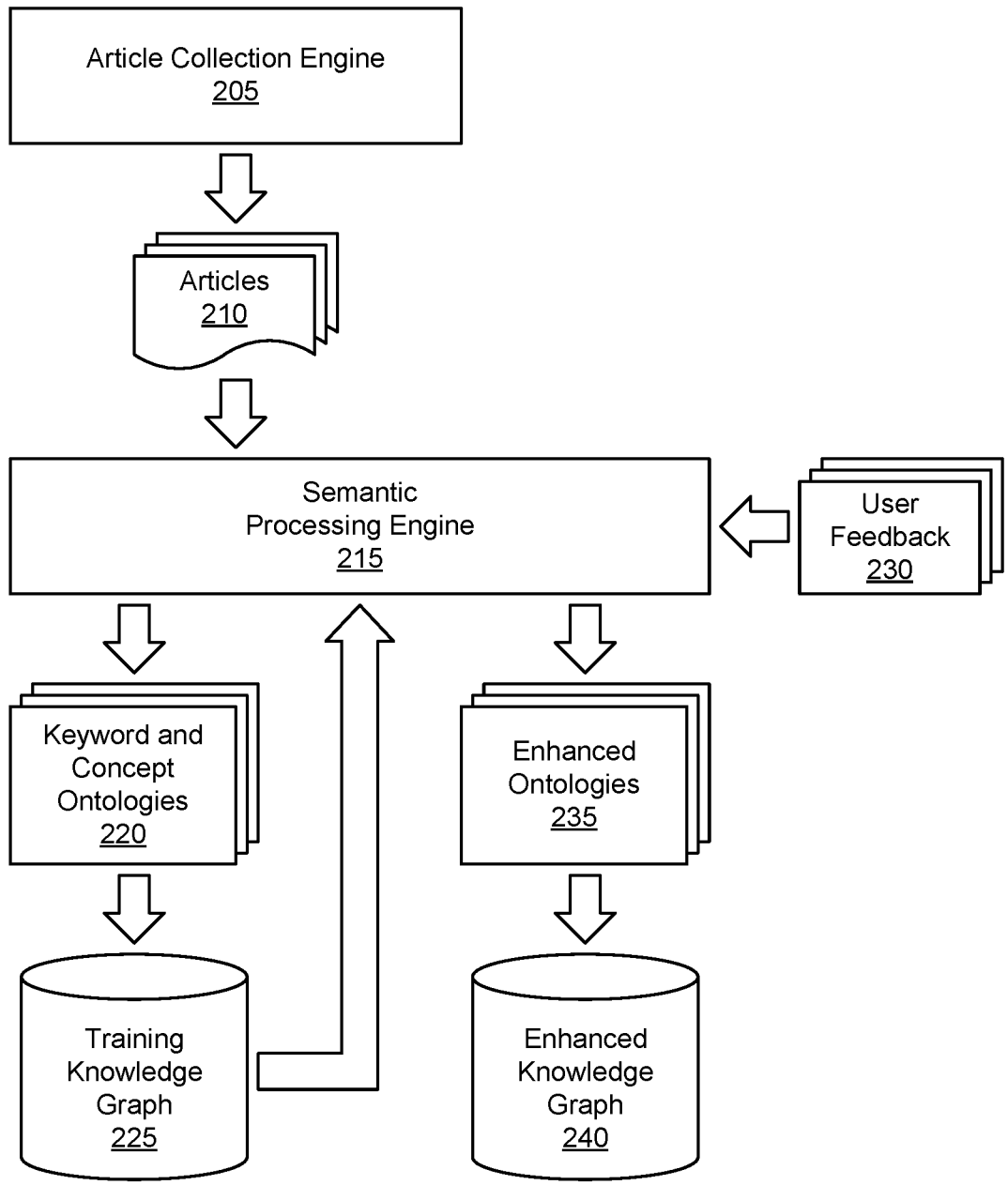
FIG. 2A is a data flow diagram illustrating the operation of the article collection and processing module, according to one embodiment.

The article management system 100 communicates over the network 150 with one or more client devices 160 operated by users of the article management system 100. The network 150 provides a communication infrastructure between the article management system 100 and the client devices 160. The network 150 is typically the Internet, but may be any network or networks, including but not limited to a Local Area Network (LAN), a Metropolitan Area Network (MAN), a Wide Area Network (WAN), a mobile wired or wireless network, a private network, a virtual private network, or some combination thereof. The client devices 160 are computing devices that allow a user to interact with the article management system 100. For example, a client device 160 may be a mobile device such as a tablet computer or a smart phone. A client device 160 may alternatively be a laptop or desktop computer FIG. 2A is a data flow diagram illustrating the operation of the article collection and processing module 105, according to one embodiment. The article collection engine 205 can use a variety of methods to collect articles 210 from multiple third-party sources. Collection methods can include, for example, subscribing to RSS feeds (e.g., RSS feeds of news agencies such as the ASSOCIATED PRESS and REUTERS), automatically scraping websites of news organizations and other organizations for new articles, and receiving articles from other data sources (e.g., websites of academic journals). In some embodiments, the article engine 205 can also collect articles 210 via manual data scrapes initiated by the users of the user devices 160. For example, a user of the article management system 100 can install a web browser plugin in mobile application that allows the user to add provide, to the article collection engine 205, any article from any web-based source that the user visits. In some embodiments, the article collection engine 205 receives and stores both the metadata and the content (e.g., the text and images) a collected article. In other embodiments, the article collection 205 stores the metadata a collected article but does not store the article's content, and instead stores a link to the article (e.g., the URL of the article on the website of the organization that published the article).

The semantic processing engine 215 receives articles 210 from the article collection engine and creates an initial set of keyword and concept ontologies 220 for each of the articles 210. The semantic processing engine 215 stores the initial set of keyword and concept ontologies 220 in a training knowledge graph 225. The operation of the semantic processing engine 215 is described in further detail below with respect to FIG. 2B.

As noted above, the article display module 120 can display collected articles 210 to users in an article viewing interface, and in some embodiments, the article viewing interface can additionally include interface elements that allow the user to provide user feedback 230 on the accuracy of the keyword and concept ontologies 220 for the article.

When the semantic processing engine 215 receives user feedback 230 for an article, the semantic processing engine 215 accesses training knowledge graph 225 to load the keyword and concept ontologies for the article and enhances the keyword and concept ontologies in accordance with the user feedback 230. For example, if the user feedback 230 indicates that one or more additional terms should be associated with a given article, the semantic processing engine 215 can add the additional terms to the keyword and concept ontologies for an article. In the embodiment shown in FIG. 2A, the semantic processing engine 215 stores the enhanced keyword and concept ontologies 235 in an enhanced knowledge graph 240. In other embodiments, the semantic processing engine 215 maintains a single knowledge graph and updates the keyword and concept ontologies in the knowledge graph in accordance with the user feedback 230. The user feedback 230 can also be used as training data for the semantic processing engine 215 to enable the semantic processing engine 215 to more accurately create keyword and concept ontologies 220 for future articles, and to more accurately determine the extent to which articles are related or unrelated to each other.

In some embodiments, the semantic processing engine 215 can also generate a sentiment score for each of the articles 210. The sentiment score is a quantity that represents the overall viewpoint of the article (i.e., whether the article covers its topic from a positive viewpoint or a negative viewpoint). In some embodiments, the semantic processing engine 215 generates the sentiment score by performing natural language processing on the text of the article. In one embodiment, the semantic processing engine 215 performs natural language processing on each sentence in the text of the article to generate a sentiment score for each sentence, and then generates an overall sentiment score for the article by combining the sentiment scores for each sentence. The semantic processing module 215 can similarly receive user feedback 230 about the accuracy of an article's sentiment score and refine the value of the sentiment score in accordance with the user feedback 230.

Figure 2B:
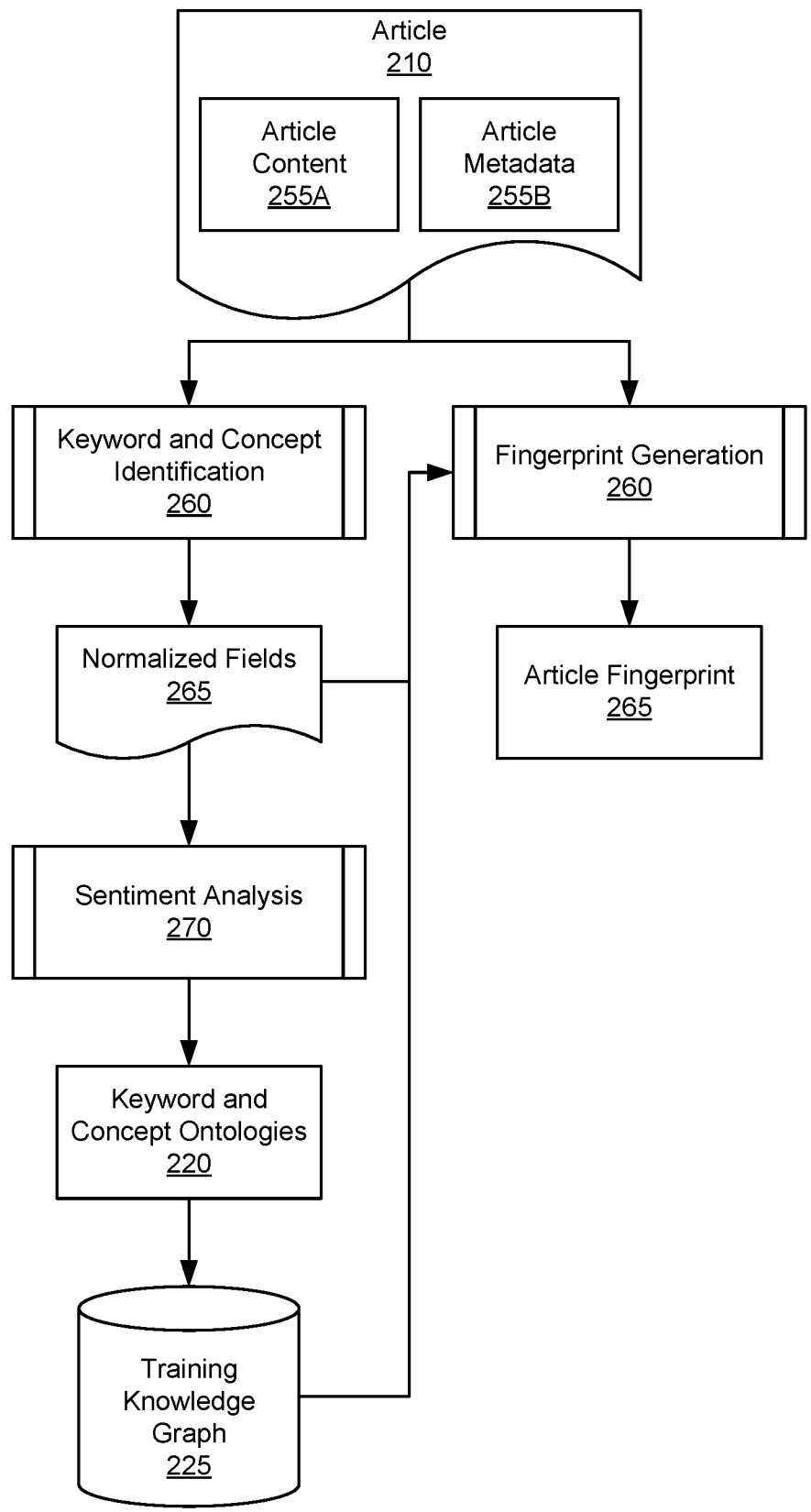
FIG. 2B is a data flow diagram illustrating the operation of the semantic processing engine, according to one embodiment.

FIG. 2B is a data flow diagram illustrating the operation of the semantic processing engine 215, according to one embodiment. The semantic processing engine 215 receives both the content 255A and metadata 255B of an article 210. The semantic processing engine 215 extracts a set of keyword and concept ontologies 220 from the content 255A and metadata 255B by performing a keyword and concept identification process 260 and a sentiment analysis process 270. The content and metadata 255A, 255B are provided to a keyword and concept identification process 260, which identifies keywords and concepts that are provided in the content and metadata 255A, 255B. For example, the metadata 255B of the article may include one or more content tags that were provided by the publisher of the article, and these tags are identified as keywords for the article. For instance, an article about the 2019 College Football National Championship may include content tags such as "college football," "Clemson Tigers," "Alabama Crimson Tide," and "Nick Saban." The keywords and concepts identified by the identification process 260 are stored together in a set of normalized fields 265 that also contains other key elements of the article, such as the title, author, and a summary of the article. The normalized fields are provided to a sentiment analysis process 270, which performs sentiment analysis and maps the extracted keyword and concept ontologies 220 to the training knowledge graph 225.

The semantic processing engine also includes a fingerprint generation process 275 that generates a fingerprint 280 for the article. The article fingerprint 280 is a data item that describes the relationship between the article and other articles that have been processed by the semantic processing engine 215. In some embodiments, the fingerprint generation process 275 is implemented with a neural network, such as a Hopfield neural network. In one embodiment, the semantic processing engine provides both the article 210 and the keyword and concept ontologies for the article (e.g., from the training knowledge graph 225) to the neural network, and the neural network outputs the article fingerprint 280. In another embodiment, the semantic processing engine additionally or alternatively provides the normalized fields 265 to the fingerprint generation process 275, and a fingerprint 280 for the article based at least in part on the normalized fields.

Figure 3A:
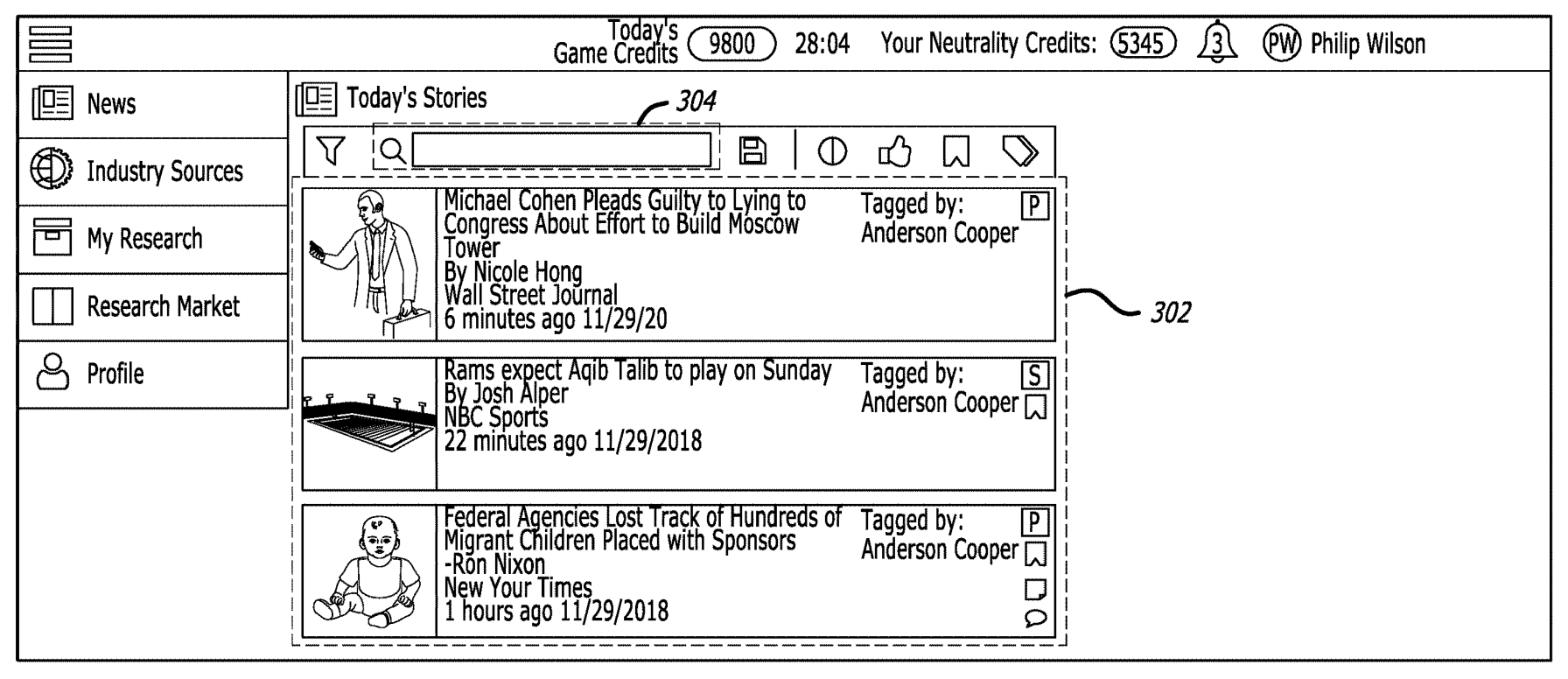

FIG. 3A is a screenshot illustrating an example an article feed interface presented by the article management system 100, according to one embodiment. The article feed interface displays multiple articles 302 to the user. When the user selects one of the articles (e.g., by clicking or tapping on the article), the article management system 100 displays an article viewing interface for the selected article. An example of an article viewing interface is shown in FIG. 3B.

The article feed interface also includes a search box 304. The search box allows the user to search for articles related to a keyword, topic, or concept by entering one or more search terms. After the user enters one or more search terms in the search box, the article management system 100 identifies keywords, categories, topics, or concepts associated with the search terms and accesses one of the knowledge graphs (e.g., the training knowledge graph or the enhanced knowledge graph) to identify articles related to the keywords, categories, topics, or concepts. The identified articles are displayed to the user as part of a search interface.

FIG. 3B is a screenshot illustrating an example of an article viewing interface presented by the article management system 100, according to one embodiment. In the example shown in FIG. 3B, the article viewing interface includes an article preview 352, a metadata section 354, a user feedback section 356, and an Open Mind section 358.

The article preview 352 displays a preview of the article. In the embodiment shown in FIG. 3B, the article preview 352 includes some of the metadata for the article, such as the title, author, date, and the publication in which the article appears. The article preview 352 also includes a short preview of the article's content (e.g., one image and one sentence from the text of the article). In this embodiment, the article preview 352 includes a link to the article on the publisher's website, so selecting the article preview 352 (e.g., by clicking or tapping on the title) opens the full article on the publisher's website. In other embodiments, all of the article's content (i.e., all of the text and images) is displayed in the article view interface.

The metadata section 354 displays a list of metadata associated with the article. The metadata shown in the metadata section 354 can include a combination of metadata that was collected by the article collection engine 205, such as the article's genre, category, and publisher, and metadata representing keyword and concept ontologies that were generated for the article by the semantic processing engine 215.

The user feedback section 356 displays user interface elements that allow the user to provide user feedback on the accuracy of the keyword and concept ontologies for the article. In the embodiment shown in FIG. 3B, the user feedback section 356 includes two portions. The Sentiment Analysis portion displays the sentiment score for the article (e.g., as calculated by the semantic processing engine 215) and provides a user interface that allows the user to submit his or her own rating of the article's viewpoint. The Keyword Analysis portion displays keywords for the article (e.g., as calculated by the semantic processing engine 215) and provides a user interface that allows the user to confirm that the current keywords are correct or propose new keywords for the article. Although not shown in FIG. 3B, in some embodiments the Keyword Analysis portion also includes a user interface that allows the user to indicate that one or more of the current keywords are incorrect.

The Open Mind section 358 displays articles that the semantic processing engine 215 has tagged with one or more of the same keywords, but with different sentiment scores than the article. In one embodiment, the article management system 100 selects articles to be displayed in the Open Mind section 358 by identifying a set of articles that share at least one keyword with the article being displayed and then removing any articles that were selected to be displayed as part of the user's article feed. In one embodiment, the Open Mind section 358 uses at least one of the keywords associated with the article, in addition to the article's fingerprint, to identify the set of articles that share at least one keyword with the article being displayed. This results in an Open Mind section 358 that includes articles that the user has not already seen and would not see upon returning to the article feed interface. Selecting articles for the Open Mind section in this manner results in articles that are more likely to describe the topic at hand from a different viewpoint than the user's viewpoint. Each of the articles in the Open Mind section 358 can further be displayed in conjunction with the article's sentiment score, which allows the user to easily see the article's viewpoint.

The Open Mind section 358 provides two key benefits. First, by displaying articles covering the same topic from a variety of different viewpoints, the user can gain a fuller understanding of the topic at hand. Second, by including articles that cover the topic at hand from a viewpoint that the user may not share, the Open Mind section 358 can have the effect of diffusing the "echo chamber" effect that often arises when a customized news aggregation service or social media feed only displays articles that match a user's pre-existing viewpoints.

Figure 4A:
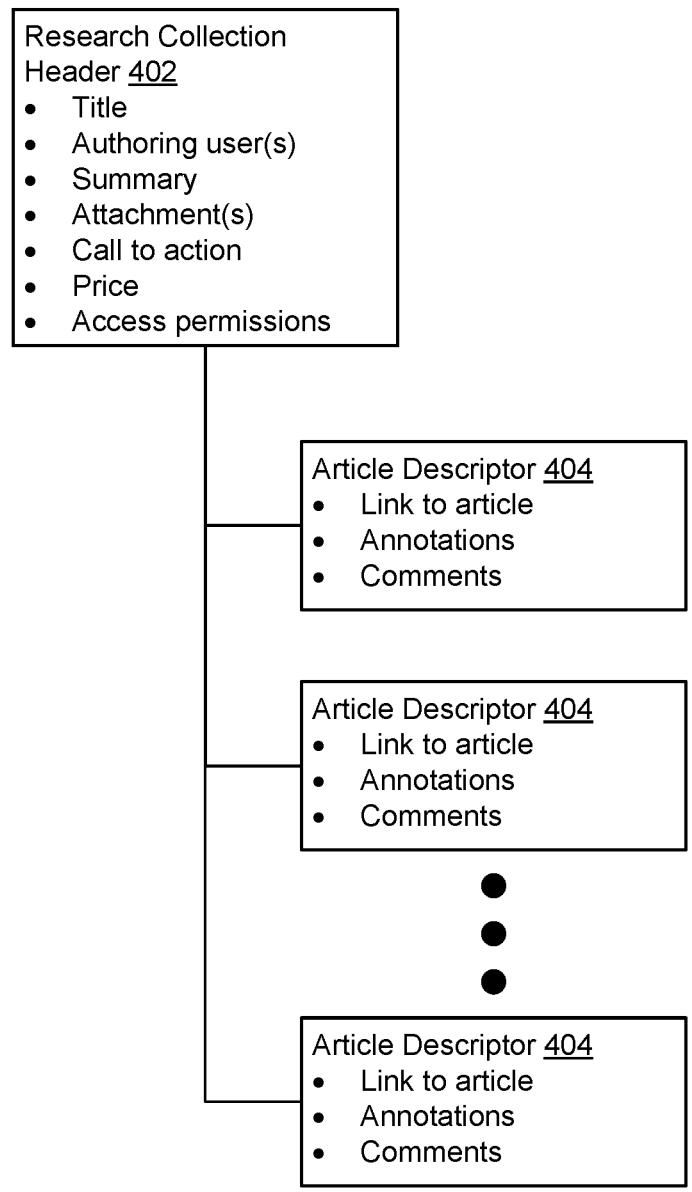
FIG. 4A is a diagram illustrating an example data structure for implementing a research collection, according to one embodiment.

FIG. 4A is a diagram illustrating an example data structure for implementing a research collection, according to one embodiment. The research collection header 402 is a data item that contains data associated with the research collection as a whole. In the embodiment shown in FIG. 4A, the header 402 includes the following elements:

a title for the research collection;

one or more user identifiers, each of which uniquely identifies one of the authoring users of the research collection (an authoring user is a user who can edit the research collection);

a summary of the research collection, which can include text and/or images;

one or more attachments, such as a research paper written by one or more of the authoring users;

a call to action related to the research collection, such as a link for users who view the research collection to donate to a charitable cause, register to vote, or submit their contact information to an organization (e.g., a non-profit organization or a political candidate's campaign) so they can receive further communications from the organization;

a price to view the research collection (the price can be specified in credits, as described above with respect to the article management system; the price can additionally or alternatively be specified in real-world currency); and access permissions for the research collection.

The access permissions specify the level of access (e.g., read, edit, etc.) to the research collection that is granted to different users of the article management system 100. For example, the access permissions can specify that each user identified as one of the authoring users can read and edit the research collection. The access permissions can also specify the extent to which other users of the article management system 100 (i.e., users who are not authoring users) can view the research collection. For example, the access permissions can specify that other users can view all of the content in the research collection. As another example, if the authoring users have specified a price to view the research collection, then the access permissions can maintain a list of users who have paid the price (and thus can view all of the content of the research collection) while specifying that other users (i.e., users who have not paid the price) can only view a preview of the research collection, which can be defined in the access permissions as subset of the content in the research collection. For instance, the access permissions can specify that users who have not paid the price can view the title, summary, and the titles of one or more predetermined articles in the research collection, but cannot view the attachments, the titles of the remaining articles, or the annotations/comments on any of the articles in the research collection.

Figure 4B:
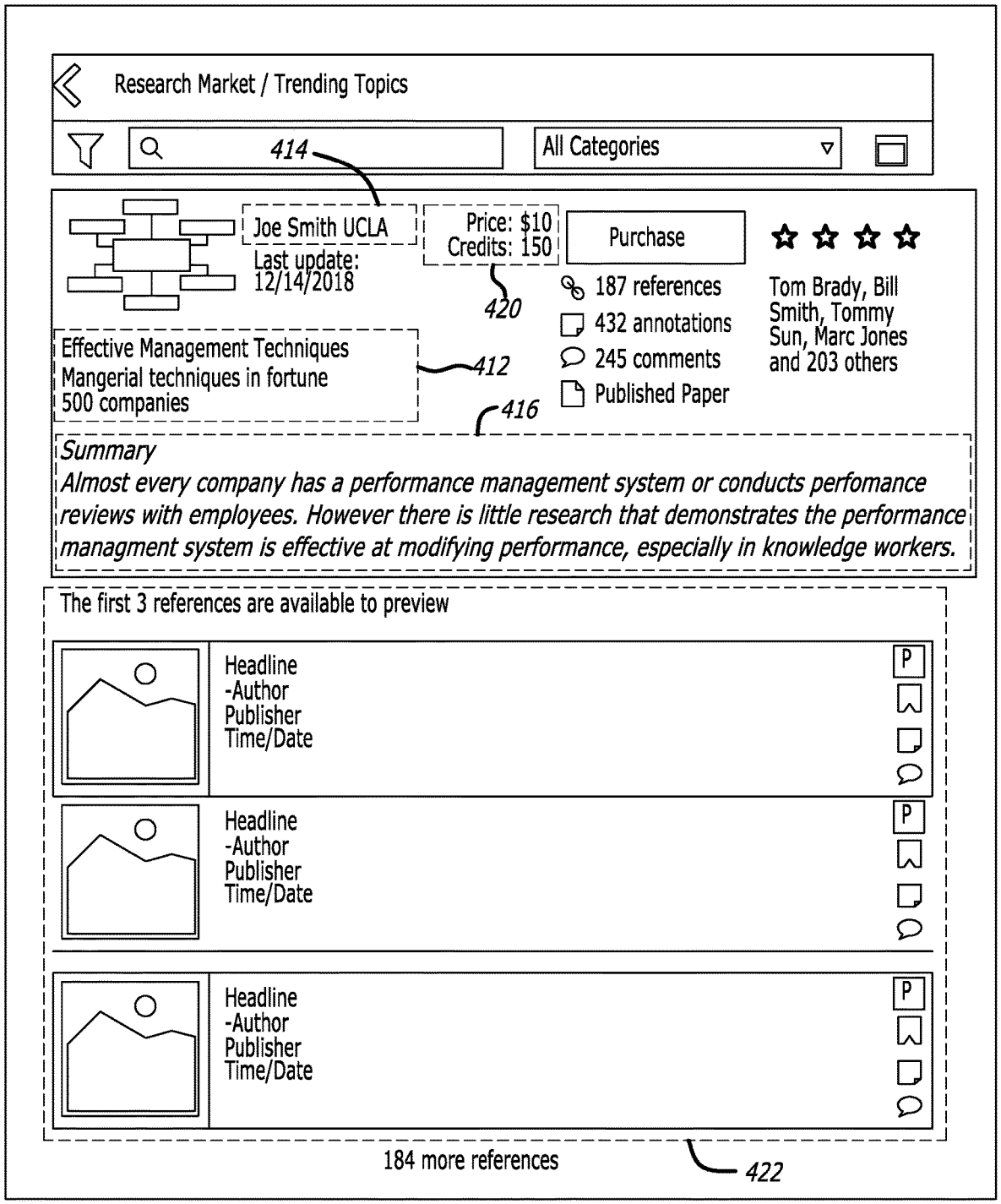
FIG. 4B is a screenshot illustrating a user interface for viewing a research collection, according to one embodiment.

FIG. 4B is a screenshot illustrating a user interface for viewing a preview of a research collection, according to one embodiment. The interface in FIG. 4B displays the title 412, the authoring user 414, the summary 416, a link to download the attachment 418, and the price 420 of the research collection. In the embodiment shown in FIG. 4B, the access permissions of the research collection specify that the first three articles are viewable by users who have not paid the specified price for the research collection. As a result, the interface in FIG. 4B further displays the first three articles 422 but does not display the remaining articles in the research collection.

Referring back to FIG. 4A, each article descriptor 404 is a data item that contains data associated with one of the articles in the research collection. In the embodiment shown in FIG. 4A, each article descriptor includes a link to the article, one or more annotations, and one or more comments. An annotation identifies an excerpt from the content of the article, such as a portion of the article's text. A comment is a content item submitted by one of the authoring users that can provide commentary on either the article as a whole or on one of the annotations. In one embodiment, each comment specifies the annotation associated with the comment (or an indication that the comment is associated with the article as a whole, the identity of the authoring user who submitted the comment, and a timestamp (e.g., a date and time) for the comment.

FIG. 4C is a screenshot illustrating a user interface for viewing annotations and comments on one article in a research collection, according to one embodiment. In the screenshot shown in FIG. 4C illustrates includes two annotations 424, 426 that each identify a portion of the article's text. The screenshot further illustrates three comments. Two of the comments 428 are associated with the first annotation 424 and thus are displayed under the first annotation 424, while the third comment 430 is associated with and is displayed under the second annotation 426.

In other embodiments, the header 402 and article descriptor 404 shown in FIG. 4A can include additional, fewer, or different elements. For example, the price can be omitted from the header in an embodiment where the article management system 100 does not implement a credit system or does not allow research collections to be offered for sale. As another example, the header 402 may further include a rating that represents an average rating given to the research collection by users who have viewed it.

Figure 5:
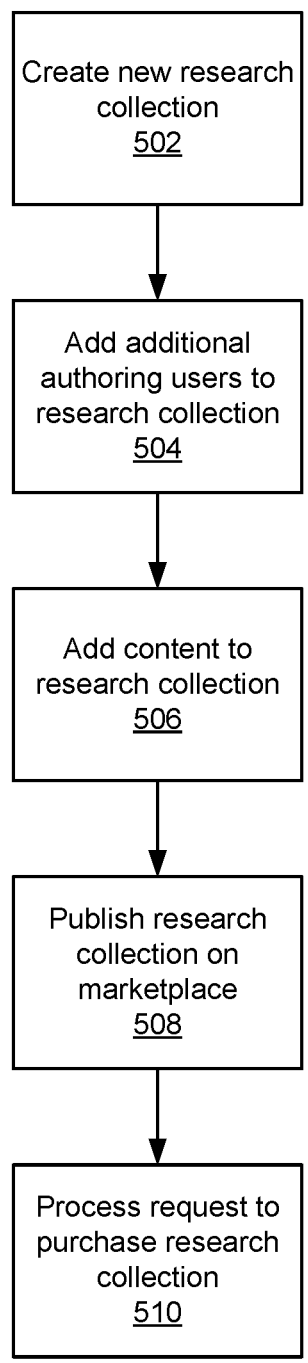
FIG. 5 is a flow chart illustrating a process for creating and publishing a research collection using the article management system, according to one embodiment.

FIG. 5 is a flow chart illustrating a process for creating and publishing a research collection using the article management system 100, according to one embodiment. In other embodiments, the process shown in FIG. 5 may include additional, fewer, or different steps, and the steps shown in FIG. 5 may be performed in a different order.

The article management system 100 creates 502 a new research collection upon receiving a creation request from a user to create the research collection (e.g., via user input on the creating user's client device). After creating 502 the new research collection, the system 100 can designate the creating user as one of the authoring users in the header 402. The article management system 100 can also add 504 additional authoring users in the header 402 (e.g., in response to a request received from the creating user or another authoring user).

The authoring users can then interact with the article management system 100 to add 506 content to the research collection. For example, the authoring users can interact with one or more of the interfaces provided by the article display module 120 to identify articles that are relevant to the topic(s) of the research collection and add those articles to the research collection. When the article management system 100 receives a request from an authoring user identifying one or more articles to be added to the research collection, the article management system 100 creates a new article descriptor 404 for the article and associates the article descriptor 404 with the research collection header 402. The authoring users can also add content to the research collection by adding or editing the title, summary, attachments, call to action, price, or access permissions of the research collection or by adding or editing annotations or comments to articles in the research collection. Upon receiving these additions or edits from an authoring user's client device, the article management system 100 makes a corresponding change to the corresponding data element in either the research collection header 402 or the article descriptor 404.

After content has been added 506 to the research collection, one of the authoring users can publish 508 the research collection on the research marketplace. After the research collection has been published 508, other users of the article management system 100 can view the research collection subject to the research collection's access permissions. For example, if the access permissions specify that other users can view all of the content in the research collection, then the research collection can be made viewable to every user of the article management system 100 once it is published 508. In contrast, if the authoring users have specified a price to view the research collection, then a preview of the research collection (as defined in the access permissions) can be made viewable to every user of the article management system 100 once it is published 508.

For research collections where a price has been specified, the article management system 100 can receive and process 510 a request to purchase the research collection. Processing 510 the purchase can include, for example, transferring the number of credits defined in the price from the balance of the purchasing user to the balance of the authoring user. If the research collection has multiple authoring users, the credits can be equally divided among the authoring users or dividing among the authoring users in some other manner (e.g., according to percentages specified by the authoring users). Processing 510 the purchase can additionally or alternatively include processing a transfer of real-world currency from the purchasing user to the authoring user(s). In addition to transferring credits and/or real-world currency, the article management system 100 also adds a user identifier for the purchasing user to the access permissions of the research collection, which allows the purchasing user to view all of the content of the research collection.

Figure 6:
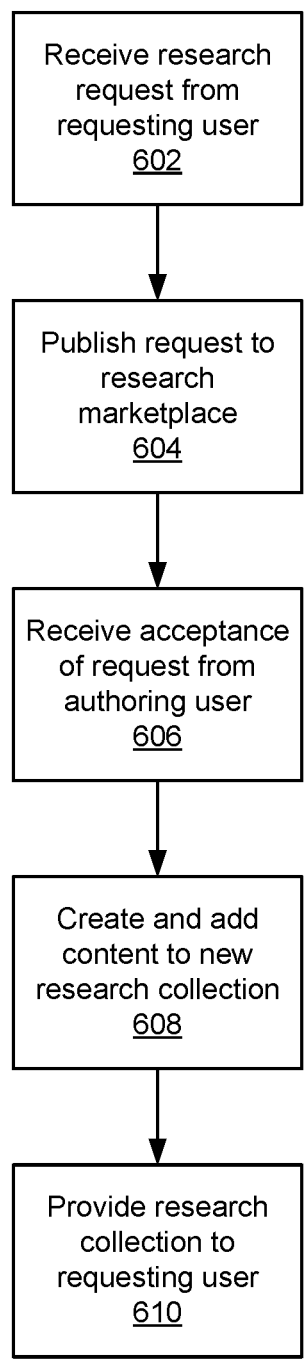
FIG. 6 is a flow chart illustrating a process for fulfilling a request for a research collection using the article management system, according to one embodiment.

FIG. 6 is a flow chart illustrating a process for fulfilling a request for a research collection using the article management system 100, according to one embodiment. In other embodiments, the process shown in FIG. 6 may include additional, fewer, or different steps, and the steps shown in FIG. 6 may be performed in a different order.

The article management system 100 receives 602 a research request from a requesting user. The research request specifies one or more topics for a new research collection and can include an offer from the requesting user to pay credits to an authoring user who accepts the request and creates the research collection.

After receiving 602 the research request, the article management system 100 publishes 604 the research request to the research marketplace. Once the research request is published 604, other users of the article management system 100 can view the research request and decide whether to accept the research request. After the article management system 100 receives 606 an acceptance of a research request from an authoring user, the article management system 100 creates 608 a new research collection and the authoring user can interact with the article management system 100 in the manner described above with respect to step 506 of FIG. 5 to add content to the research collection.

The article management system 100 provides 610 the research collection to the requesting user. For example, after the authoring user has performed research on the topic(s) specified in the research request and added articles, comments, annotations, attachments, and other content to the research collection, the authoring user can send an indication to the article management system 100 that the research collection is ready to be reviewed by the requesting user (e.g., by selecting an user interface element to provide the research collection to the requesting user). In response to receiving the indication, the article management system 100 updates the access permissions of the research collection so that the requesting user can view the research collection.

In various embodiments, the article management system 100 can send alerts to one or more of the users associated with a research collection to notify the users of various events related to the research collection. In some embodiments, the alert is implemented as a push notification (i.e., the article management system 100 initiates the sending of the alert). The alert may alternatively be implemented as a pull notification (i.e., the alert is sent in response to a user-initiated poll of the article management system 100). Alerts can be sent to an email address associated with the receiving user, displayed as a message in a user interface provided by the article management system 100, provided on a notification service that is implemented as part of operating system on the receiving user's client device 160, delivered in a different manner, or some combination thereof.

For example, in the embodiment shown in FIG. 6, the article management system 100 can send an alert to the requesting user to inform him or her that the research collection is viewable in response to receiving the indication from the authoring user that the research collection is ready to be reviewed. As another example, when an authoring user adds an additional authoring user to the research collection (e.g., as described in step 504 in FIG. 5), the article management system 100 may send an alert to the additional authoring user. As still another example, if a research collection has multiple authoring users, the article management system 100 may send an alert to the other authoring users when one authoring user adds or removes a new article to the research collection, adds, edits, or removes a comment or annotation to an article in the research collection, or adds, edits, or removes information in the research collection's header.

In some embodiments, the article management system 100 can automatically identify new articles related to one of the topics of an existing research collection. The topics for a research collection can be provided by one or more of the authoring users and stored as part of the research collection's header. Additionally or alternatively, the article management system 100 can automatically identify one or more topics for a research collection based on the keyword and concepts associated with the articles in the research collection. For example, the article management system 100 automatically adds a topic to a research collection if the number or percentage of articles in the research collection associated with a particular keyword exceeds a threshold (e.g., if more than 75% of the articles in the research collection are associated with the keyword "college football," then "college football" is added as a topic for the research collection as a whole). In some embodiments, the article management system 100 can alternatively prompt one or more of the authoring users to confirm that the one or more topics have been correctly identified before adding the topics to the research collection. In one embodiment, the article management system 100 can prompt the authoring user(s) to confirm and add every identified topic at once, to confirm and add the identified topics one by one, or it can provide both options to the authoring user(s).

The functionality of the article collection and processing module 105 can then be used to automatically identify new articles related to one of the topics of a research collection. As described above with respect to FIGS. 1 and 2A, the article collection and processing module 105 collects articles from one or more different sources and performs semantic processing on each article to identify keywords associated with the article. If an article is tagged with one or more keywords that match or are related to one or more of the topics associated with the research collection, then the article is identified as being related to the research collection.

After identifying one or more new articles as being related to a research collection, the article management system can send an alert to one or more of the authoring users of the research collection to prompt the authoring users to add the identified articles to the research collection. In various embodiments, a separate alert can be sent for each identified article. Alternatively, a single alert can be sent for multiple identified articles. For instance, an alert can be sent at regular time intervals (e.g., every day, week, or month) containing related articles that were published during that time interval, or every time a threshold number of related articles have been identified (e.g., every time 10 new related articles have been identified). This advantageously allows the authoring users to spend less time manually searching for related articles.

The article management system 100 can also be configured to continue identifying related articles and alerting the authoring users in this manner after a research collection has been published. For example, if the example research collection shown in FIG. 4C is published shortly after the 2019 College Football Championship in January 2019, the article management system 100 may identify new articles covering various college football postseason events and send an alert to one or more of the authoring users about those new articles. This has the benefit of prompting the authoring users to keep a research collection up to date with new events without requiring any of the authoring users to continue performing research about the topic after the research collection has been published.

The article management system 100 can continue identifying related articles for a research collection after its authoring users have stopped managing and updating the research collection. For example, if an authoring user creates a research collection for a school project, the authoring user might stop managing and updating the research collection once the project has been submitted. In some embodiments, the article management system 100 allows another user (i.e., a user who is not one of the authoring users of the research collection) to take over a research collection if no authoring user has made any modifications to the research collection (e.g., by adding new articles or adding annotations or comments to existing articles) for a threshold period of time (e.g., 1 month, 2 months, 4 months, etc.). This can be done, for example, by removing the existing authoring users from the research collection header 402 and adding the other user as a new authoring user. In one embodiment, the article management system 100 requires the other user to make a payment (e.g., in credits) to the existing authoring users in order to take over a research collection in, this manner. In other words, this allows the other user to purchase the rights of research collection from the authoring users. This process of allowing another user to take over a research collection allows the other user to start updating the research collection again, such as by adding new articles, annotations, and comments or by adding some or all of the related articles that the article management system 100 has identified since the previous authoring users stopped updating the research collection.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

While various embodiments have been described above, it should be understood that they have been presented by way of example only, and not limitation. Thus, the breadth and scope of a disclosed embodiment should not be limited by any of the above-described exemplary embodiments, but should be defined only in accordance with the following claims and their equivalents.

What is claimed is:

1. A computer-implemented method comprising:
creating a research collection at an article management system, the research collection including access permissions identifying one or more users of the article management system and, for each of the identified users, specifying a level of access to the research collection granted to the identified user;
designating a first user of the article management system as an authoring user of the research collection by modifying the access permissions to specify that the first user is able to view and edit the research collection;
receiving a first request from the first user, the first request specifying a first article to be added to the research collection;
processing the first article to identify one or more keywords by a semantic processing engine of the article management system, the one or more keywords representing a topic covered by the first article;
performing natural language processing on the first article to generate a sentiment score for the first article comprising a quantity representing a viewpoint of the first article that is indicative of whether the first article covers the topic from a positive viewpoint or a negative viewpoint;
adding a first article descriptor to the research collection, the first article descriptor including an identifier for the first article;
storing the one or more keywords and the sentiment score in association with the first article;
identifying, a set of related articles to the first article that each share at least one of the one or more keywords associated with the first article and include different sentiment scores than the first article to reflect a different viewpoint of the topic covered by the first article; and
publishing the research collection by modifying the access permissions to allow one or more additional users of the article management system to view the research collection, wherein publishing includes presenting, in an article viewing interface associated with the research collection, a preview of the first article together with previews for the set of related articles and the sentiment scores for the set of related articles.

2. The method of claim 1, further comprising:
designating a second user of the article management system as an additional authoring user of the research collection, the second user identified by the first user after designating the first user as the authoring user of the research collection.

3. The method of claim 2, further comprising:
receiving a second request from the second user, the second request specifying a second article to be added to the research collection; and
adding a second article descriptor to the research collection, the second article descriptor including an identifier for the second article.

4. The method of claim 3, further comprising:
responsive to receiving the second request, sending an alert to the first user, the alert containing a message indicating that the second article has been added to the research collection.

5. The method of claim 1, further comprising:
adding an annotation to the first article descriptor, the annotation specifying a span of text within the first article.

6. The method of claim 5, further comprising:
adding a comment to the first article descriptor, the comment associated with the annotation and including text provided by the authoring user to be displayed in association with the span of text specified in the annotation.

7. The method of claim 1, wherein the research collection is created in response to a creation request received from the first user.

8. The method of claim 1, further comprising:
receiving, from a third user of the article management system, a research request specifying one or more topics for a new research collection;
publishing the research request on a research marketplace, the research request being viewable to other users of the article management system once published on the research marketplace; and
receiving an acceptance of the research request from the first user,
wherein the first user is designated as the authoring user of the research collection responsive to receiving the acceptance.

9. The method of claim 1, wherein publishing the research collection includes modifying the access permissions to specify that all users of the article management system can view the research collection.

10. The method of claim 1, wherein publishing the research collection includes modifying the access permissions to add one or more additional users of the article management system as viewing users, and to specify that the viewing users are able to view the research collection.

11. The method of claim 10, wherein an additional user is added as a viewing user responsive to processing a request from the additional user to purchase the research collection.

12. The method of claim 1, further comprising:
automatically identifying, using the semantic processing engine of the article management system, an article as being related to a topic associated with the research collection; and
sending an alert to the authoring user to prompt the authoring user to add the identified article to the research collection.

13. A computing system comprising:
a processor; and
a non-transitory computer-readable storage medium comprising computer program code, the computer program code when executed by the processor causing the processor to perform steps comprising:
creating a research collection at an article management system, the research collection including access permissions identifying one or more users of the article management system and, for each of the identified users, specifying a level of access to the research collection granted to the identified user;
designating a first user of the article management system as an authoring user of the research collection by modifying the access permissions to specify that the first user is able to view and edit the research collection;
receiving a first request from the first user, the first request specifying a first article to be added to the research collections;
processing the first article to identify one or more keywords by a semantic processing engine of the article management system, the one or more keywords representing a topic covered by the first article;
performing natural language processing on the first article to generate a sentiment score for the first article comprising a quantity representing a viewpoint of the first article that is indicative of whether the first article covers the topic from a positive viewpoint or a negative viewpoint;
adding a first article descriptor to the research collection, the first article descriptor including an identifier for the first article;
storing the one or more keywords and the sentiment score in association with the first article;
identifying, a set of related articles to the first article that each share at least one of the one or more keywords associated with the first article and include different sentiment scores than the first article to reflect a different viewpoint of the topic covered by the first article; and
publishing the research collection by modifying the access permissions to allow one or more additional users of the article management system to view the research collection, wherein publishing includes presenting, in an article viewing interface associated with the research collection, a preview of the first article together with previews for the set of related articles and the sentiment scores for the set of related articles.

14. The computing system of claim 13, the steps further comprising:
designating a second user of the article management system as an additional authoring user of the research collection, the second user identified by the first user after designating the first user as the authoring user of the research collection.

15. The computing system of claim 14, the steps further comprising:
receiving a second request from the second user, the second request specifying a second article to be added to the research collection;
adding a second article descriptor to the research collection, the second article descriptor including an identifier for the second article.

16. The computing system of claim 15, the steps further comprising:
responsive to receiving the second request, sending an alert to the first user, the alert containing a message indicating that the second article has been added to the research collection.

17. The computing system of claim 13, the steps further comprising:
adding an annotation to the first article descriptor, the annotation specifying a span of text within the first article.

18. The computing system of claim 17, the steps further comprising:
adding a comment to the first article descriptor, the comment associated with the annotation and including text provided by the authoring user to be displayed in association with the span of text specified in the annotation.

19. The computing system of claim 13, wherein the research collection is created in response to a creation request received from the first user.

20. A non-transitory computer-readable storage medium storing computer program code, the computer program code when executed by one or more processors causing the one or more processors to perform steps comprising:
creating a research collection at an article management system, the research collection including access permissions identifying one or more users of the article management system and, for each of the identified users, specifying a level of access to the research collection granted to the identified user;
designating a first user of the article management system as an authoring user of the research collection by modifying the access permissions to specify that the first user is able to view and edit the research collection;
receiving a first request from the first user, the first request specifying a first article to be added to the research collection;
processing the first article to identify one or more keywords by a semantic processing engine of the article management system, the one or more keywords representing a topic covered by the first article;
performing natural language processing on the first article to generate a sentiment score for the first article comprising a quantity representing a viewpoint of the first article that is indicative of whether the first article covers the topic from a positive viewpoint or a negative viewpoint;
adding a first article descriptor to the research collection, the first article descriptor including an identifier for the first article;
storing the one or more keywords and the sentiment score in association with the first article;
identifying, a set of related articles to the first article that each share at least one of the one or more keywords associated with the first article and include different sentiment scores than the first article to reflect a different viewpoint of the topic covered by the first article; and
publishing the research collection by modifying the access permissions to allow one or more additional users of the article management system to view the research collection, wherein publishing includes presenting, in an article viewing interface associated with the research collection, a preview of the first article together with previews for the set of related articles and the sentiment scores for the set of related articles.

* * * * *